(12) United States Patent
Sugai

(10) Patent No.: US 11,358,364 B2
(45) Date of Patent: Jun. 14, 2022

(54) VEHICLE INTERIOR MEMBER

(71) Applicant: TOYODA GOSEI CO., LTD., Kiyosu (JP)

(72) Inventor: Takaaki Sugai, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 0 days.

(21) Appl. No.: 16/884,315

(22) Filed: May 27, 2020

(65) Prior Publication Data

US 2020/0391473 A1 Dec. 17, 2020

(30) Foreign Application Priority Data

Jun. 17, 2019 (JP) .............................. JP2019-112368

(51) Int. Cl.
*B32B 9/00* (2006.01)
*B32B 3/04* (2006.01)
*B32B 5/18* (2006.01)
*B32B 3/28* (2006.01)
*B32B 9/02* (2006.01)
*B32B 9/04* (2006.01)

(52) U.S. Cl.
CPC .................. *B32B 3/04* (2013.01); *B32B 3/28* (2013.01); *B32B 5/18* (2013.01); *B32B 9/025* (2013.01); *B32B 9/045* (2013.01); *B32B 9/046* (2013.01); *B32B 2266/0278* (2013.01); *B32B 2323/10* (2013.01); *B32B 2605/003* (2013.01)

(58) Field of Classification Search
CPC ..... Y10T 428/24033; Y10T 428/24223; Y10T 428/2424; Y10T 428/24256; Y10T 428/24198; B32B 3/04; B32B 7/09; B32B 9/025; B32B 2605/003; B60R 13/02; B60R 13/0256; B60R 13/0262; B60R 13/0237; B60R 21/04
See application file for complete search history.

(56) References Cited

U.S. PATENT DOCUMENTS

2008/0217943 A1* 9/2008 Iwata .................... B60R 13/02
296/24.34
2011/0076444 A1 3/2011 Fukui et al.
2014/0054914 A1* 2/2014 Teoh ...................... B32B 9/025
296/1.08

FOREIGN PATENT DOCUMENTS

JP            4973956 B2    4/2012

* cited by examiner

*Primary Examiner* — Alexander S Thomas
(74) *Attorney, Agent, or Firm* — Posz Law Group, PLC

(57) ABSTRACT

A vehicle interior member includes: a first core material; a first skin forming a first rim part in which at least a part of the peripheral edge part is folded back to the back surface side of the first core material to sandwich a peripheral edge part of the first core material; a second core material; a second skin forming a second rim part in which at least a part of the peripheral edge part is folded back to the back surface side of the second core material to sandwich a peripheral edge part of the second core material; and a stitch part that stitches the first rim part, the peripheral edge part of the first core material sandwiched by the first rim part, the second rim part, and the peripheral edge part of the second core material sandwiched by the second rim part.

7 Claims, 2 Drawing Sheets

VEHICLE INTERIOR MEMBER

CROSS-REFERENCE TO RELATED APPLICATION(S)

This application is based upon and claims the benefit of priority from prior Japanese patent application No. 2019-112368 filed on Jun. 17, 2019, the entire contents of which are incorporated herein by reference.

BACKGROUND

1. Field of the Invention

The present invention relates to a vehicle interior member provided in a vehicle.

2. Description of the Related Art

Among various types of vehicle mounting members to be mounted on a vehicle, there is one in which a base material surface exposed in a vehicle interior is covered by a vehicle interior member such as a design panel.

In order to provide excellent design properties to the vehicle interior member exposed in the vehicle interior, disclosed is a technology in which an outer surface of the vehicle interior member is formed with a skin (for example, refer to Japanese Patent No. 4973956).

A member with a skin disclosed in Japanese Patent No. 4973956 includes a base body and a skin body covering the base body. Of these base body and skin body, the skin body is a body in which a first skin material and a second skin material are bound together to face each other inside, and are further turned over. As illustrated in FIGS. 4 and 5 of Japanese Patent No. 4973956, a binding portion between the first skin material and the second skin material is disposed on a peripheral edge portion of the member with the skin. A decorative stitch is formed in the first skin material on the side closer to the center than the binding portion. Therefore, the peripheral edge portion of the member with the skin displays a design having a double bead.

Meanwhile, Japanese Patent No. 4973956 also discloses a technology in which a portion displaying the above-described bead-shaped design is made to have the same thickness at that of the first skin material side (that is, a first peripheral edge skin part) and that of the second skin material side (that is, a second peripheral edge skin part). A first embodiment and FIG. 5 in Japanese Patent No. 4973956 are intend to describe that the first peripheral edge skin part and the second peripheral edge skin part are made to have the same thickness in such a manner that a core part is wound around the first peripheral edge skin part, and a sub core part is wound around the second peripheral edge skin part, and a design as if two beads having a uniform shape are arranged side by side is displayed on the peripheral edge part in the member with the skin.

However, in order to make the first peripheral edge skin part and the second peripheral edge skin part having the same thickness by the technology described above, it is required to position the sub core part with respect to the core part, the first peripheral edge skin part, and the second peripheral edge skin part with high accuracy. Therefore, a process of manufacturing this kind of member with the skin is complicated, and thus a skill required for a worker is also high.

SUMMARY

The present invention has been made considering the above-described circumstances, and an object thereof is to provide a technology capable of manufacturing a vehicle interior member having excellent design properties with high workability.

According to an aspect of the invention, there is provide a vehicle interior member, mounted on a base material surface of a vehicle mounting member, the vehicle interior member including: a first core material; a first skin that is softer than the first core material, superposed on a surface of the first core material, and forms a first rim part having a U-shaped cross section in which at least a part of the peripheral edge part is folded back to the back surface side of the first core material to sandwich a peripheral edge part of the first core material; a second core material superposed on the first core material while facing the back surface with respect to the back surface of the first core material; a second skin that is softer than the second core material, superposed on a surface of the second core material, and forms a second rim part having a U-shaped cross section in which at least a part of the peripheral edge part is folded back to the back surface side of the second core material to sandwich a peripheral edge part of the second core material; and a stitch part that stitches the first rim part, the peripheral edge part of the first core material sandwiched by the first rim part, the second rim part, and the peripheral edge part of the second core material sandwiched by the second rim part.

A vehicle interior member of the present invention can be manufactured with high workability and is excellent in design properties.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
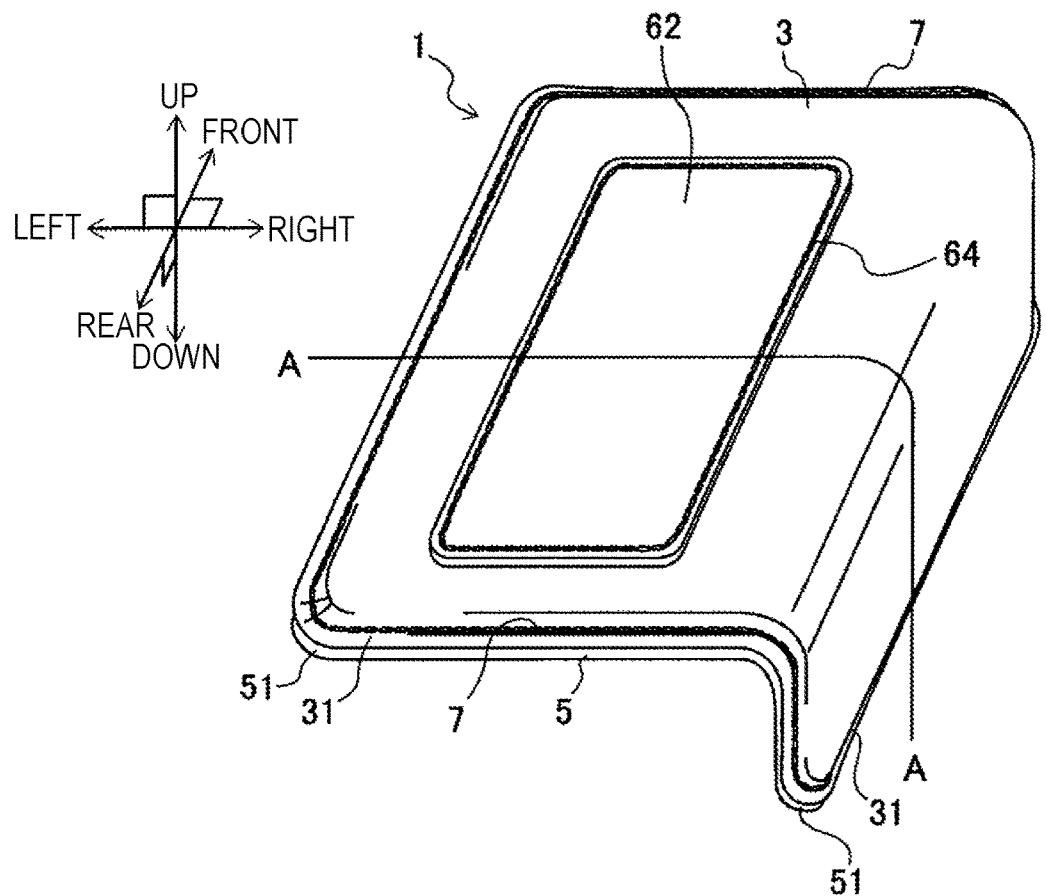
FIG. 1 is an explanatory diagram schematically illustrating a vehicle interior member according to a first embodiment.

A vehicle interior member of the present invention is mounted on a base material surface of a vehicle mounting member. The vehicle mounting member referred to herein is not particularly limited, and may include, for example, various members and devices that have some base material such as an instrument panel, a door panel, and a console box, and that are mounted on a vehicle. A base material surface refers to a surface for mounting the vehicle interior member of the present invention on the base material of the vehicle mounting member.

The vehicle interior member of the present invention may be referred to as a decorative panel that is mounted on the base material surface of these vehicle mounting members and is exposed in a vehicle interior.

The vehicle interior member of the present invention includes a first core material, a first skin, a second core material, a second skin, and a stitch part. Among them, the first skin is softer than the first core material, and the second skin is softer than the second core material. Such first core material and second core material can be literally referred to as elements functioning as core materials in the vehicle interior member of the present invention.

The first skin is superposed on a surface of the first core material, the second core material is superposed on the first core material while facing a back surface with respect to the back surface of the first core material, and the second skin is superposed on a surface of the second core material. Therefore, the first core material and the second core material are superposed on each other while the back surfaces thereof face each other, the surface of the first core material is covered with the first skin, and the surface of the second core material is covered with the second skin.

That is, these respective elements in the vehicle interior member of the present invention are superposed in the order of the first skin, the first core material, the second core material, and the second skin. Among them, the first core material and the second core material are hidden inside the vehicle interior member of the present invention, and thus it can be said that the first skin and the second skin are exposed on an outer surface of the vehicle interior member of the present invention.

In the present specification, the two elements that are "superposed on each other" may contact each other or may not contact each other. Another element may be interposed between the two elements.

The first skin is superposed on the surface of the first core material. A first rim part, which is at least a part of a peripheral edge part of the first skin, is folded back to the back surface side of the first core material. Therefore, at least a part of a peripheral edge part of the first core material is sandwiched by the first rim part. The first rim part is almost formed as a U-shaped cross section to be folded back from the front side to the back side of the first core material.

In the same manner, the second skin is superposed on the surface of the second core material. A second rim part, which is at least a part of a peripheral edge part of the second skin, is folded back to the back surface side of the second core material. Therefore, at least a part of a peripheral edge part of the second core material is sandwiched by the second rim part. The second rim part is almost formed as a U-shaped cross section to be folded back from the front side to the back side of the second core material.

The first rim part, the peripheral edge part of the first core material sandwiched by the first rim part, the second rim part, and the peripheral edge part of the second core material sandwiched by the second rim part are stitched together by a stitch part in a stated of being superposed on each other, whereby a design in which two beads are arranged in a thickness direction is provided to a peripheral edge part of the vehicle interior member.

Here, since the first core material is sandwiched by the first rim part, a thickness of the first core material is related to a thickness of the first rim part. In the same manner, since the second core material is sandwiched by the second rim part, a thickness of the second core material is related to a thickness of the second rim part. Therefore, in the vehicle interior member of the present invention, by appropriately setting the thickness of the first core material and the second core material, the thickness of the first rim part and the thickness of the second rim part can be freely adjusted.

Hereinafter, as necessary, the peripheral edge part of the first core material sandwiched by the first rim part is referred to as a first peripheral edge core part, and the peripheral edge part of the second core material sandwiched by the second rim part is referred to as a second peripheral edge core part.

Meanwhile, as in the member with the skin introduced in Japanese Patent No. 4973956, in order to stitch the first skin material and the second skin material together to face each other inside and to hide its binding margin on the back surface side of a decorative stitch, and to make a first peripheral edge skin part and a second peripheral edge skin part approximately the same thickness, as described above, it is required to position each element with high accuracy.

On the other hand, in the vehicle interior member of the present invention, the first rim part, the first peripheral edge core part, the second rim part, and the second peripheral edge core part are actually stitched together by the stitch part. The soft first rim part is lined with the first peripheral edge core part of the first core material, and in the same manner, the soft second rim part is lined with the second peripheral edge core part of the second core material.

Therefore, at the time of manufacturing the vehicle interior member of the present invention, in order to determine positions of the first rim part, the first peripheral edge core part, the second rim part, and the second peripheral edge core part, it is only required to determine positions of the first core material and the second core material. Since the first rim part, the first peripheral edge core part, the second rim part, and the second peripheral edge core part are fixed to each other once stitched by the stitch part, handing performance is excellent.

As described above, by appropriately setting the thickness of the first core material and the thickness of the second core material, the thickness of the first rim part and the thickness of the second rim part can be freely adjusted.

Such a vehicle interior member according to the present invention can be manufactured with high workability in spite of excellent design properties.

Hereinafter, the vehicle interior member of the present invention will be described for each element.

The first core material and the second core material in the vehicular interior member of the present invention have a shape corresponding to a shape required for the vehicular interior member of the present invention. The first core material and the second core material may not have a shape that completely coincides with an outer shape of the vehicle interior member of the present invention, and for example, the first core material or the second core material may not have a frame shape in which its center portion is opened in a window shape.

However, since the first core material and the second core material are elements that contribute to the rigidity and intensity of the vehicle interior member of the present invention, when the high rigidity and intensity are required for the vehicle interior member of the present invention, it is desirable that the first core material and the second core material have a shape such as a simple plate shape not including a large window part or not including the window part at all.

It is desirable that the first core material and the second core material have almost the same shape. When the first core material and the second core material have almost the same shape, it is easy to determines the positions of the first core material and the second core material, and thus workability at the time of manufacturing the vehicle interior member of the present invention is further improved.

When the first core material and the second core material have different shapes, since the first rim part, the first peripheral edge core part, the second rim part, and the second peripheral edge core part are stitched together by the stitch part, at least the first peripheral edge core part of the first core material and the second peripheral edge core part of the second core material are required to be at positions facing each other in the thickness direction of the vehicle interior member.

The first core material and the second core material may be respectively harder than the first skin and the second skin, and the material and hardness thereof may be appropriately set according to the hardness required for the vehicle interior member of the present invention. The materials of the first core material and the second core material may be the same material or different materials.

As a suitable material for the first core material and the second core material, there are resin, paper, leather, and wood material having Rockwell hardness of HRR 125 or less as examples. Specifically, there are resin such as polypropylene and polyethylene terephthalate, thick paper, leather, and fiberboard as examples.

With respect to the Rockwell hardness of the first core material and the second core material, there is no desirable lower limit, and considering the fact that the first core material and the second core material are harder than the first skin and the second skin, the Rockwell hardness is desirably equal to or higher than HRR 10, and is more desirably equal to or higher than HRR 20.

The thickness of the first core material and the thickness of the second core material may be appropriately set according to the outer shape required for the vehicle interior member of the present invention, and may be desirable to be in the range of 0.18 to 1.0 mm for the convenience of being stitched together by the stitch part.

The first skin and the second skin in the vehicle interior member of the present invention are respectively folded back at the first rim part and the second rim part, the outer dimensions thereof may be larger than those of the first core material and the second core material, and the shapes thereof are not particularly limited. In order for the first skin and the second skin to be folded at the first rim part and the second rim part, it is desirable to have a shape whose length in the thickness direction is shorter than the length in the plane direction, and to have, for example, a plate shape and a sheet shape. The first skin and the second skin may have the same shape or different shapes.

The thickness of the first skin and the second skin may also be appropriately set according to the outer shape required for the vehicle interior member of the present invention, and may be desirable to be in the range of 0.2 to 3.0 mm for the convenience of being stitched by the stitch part.

The first skin may be softer than the first core material and may be bent and deformed. The second skin may be softer than the second core material and may be bent and deformed. Such materials of the first skin and the second skin are not particularly limited, and as a desirable material, there are leather, polyurethane, vinyl chloride, a cloth hanging made of natural fiber or chemical fiber, and artificial leather as examples. The first skin and the second skin may be made of the same material, or may be made of different materials.

The first skin may cover the whole first core material, or may cover only a part of the first core material. In the same manner, the second skin may cover the whole second core material or may cover only a part of the second core material.

For example, when the whole vehicle interior member of the present invention is exposed in the vehicle interior, it is desirable that the first skin covers the whole first core material and the second skin covers the whole second core material. However, when only a part of the peripheral edge part in the vehicle interior member of the present invention is exposed in the vehicle interior and other parts of the peripheral edge part are hidden, in the hidden portion, the first core material may not be covered with the first skin, and the second core material may not be covered with the second skin. However, even in such a case, it is required that the first skin includes the first rim part that covers the first peripheral edge core part of the first core material, and the second skin includes the second rim part that covers the second peripheral edge core part of the second core material.

As described above, the first skin is superposed on the surface of the first core material, the second core material is superposed on the first core material while facing the back surface with respect to the back surface of the first core material, and the second skin is superposed on the surface of the second core material. The first peripheral edge core part of the first core material is sandwiched by the first rim part, and the second peripheral edge core part of the second core material is sandwiched by the second rim part of the second skin.

Hereinafter, as necessary, a portion of the first rim part that covers the surface of the first peripheral edge core part is referred to as a first front rim part, and a portion of the first rim part that covers the back surface of the first peripheral edge core part is referred to as a first back rim part. A portion of the second rim part that covers the surface of the second peripheral edge core part is referred to as a second front rim part, and a portion of the second rim part that covers the back surface of the second peripheral edge core part is referred to as a second back rim part.

In at least a part of the peripheral edge portion in the vehicle interior member of the present invention, the respective elements are superposed in the order of the first front rim part, the first peripheral edge core part, the first back rim part, the second back rim part, the second peripheral edge core part, the second front rim part, and stitched together by the stitch part. These elements are adjacent to each other in the order described above. Therefore, it can be said that the first rim part is lined with the first peripheral edge core part and is formed into a shape along the first peripheral edge core part. It can be said that the second rim part is lined with the second peripheral edge core part and is formed into a shape along the second peripheral edge core part. When the sum of the thickness of the first front rim part, the thickness of the first back rim part, and the thickness of the first peripheral edge core part, and the sum of the thickness of the second front rim part, the thickness of the second back rim part, and the thickness of the second peripheral edge core part are made approximately the same as each other, it may be seen that the thickness of the first rim part and the thickness of the second rim part are almost the same as each other when the vehicle interior member of the present invention is viewed. Therefore, an excellent design is provided on the peripheral edge portion of the vehicle interior member of the present invention, such that two beads having almost the same shape are arranged in the thickness direction.

Meanwhile, with respect to the work of sandwiching the first peripheral edge core part by the first rim part, sandwiching the second peripheral edge core part by the second rim part, and stitching these parts by the stitch part, it is desirable to fix the first back rim part of the first rim part to the back surface of the first peripheral edge core part and to fix the second back rim part of the second rim part to the back surface of the second peripheral edge core part. As a fixing method in such a case, various well-known methods may be adopted, and considering work efficiency, it is desirable that the first back rim part of the first rim part is bonded to the back surface of the first peripheral edge core part, and the second back rim part of the second rim part is bonded to the back surface of the second peripheral edge core part. As necessary, the whole first skin may be bonded to the first core material, and the whole second skin may be bonded to the second core material. The surface of the first back rim part may be bonded to the surface of the second back rim part. An adhesive used for the bonding thereof may be appropriately selected according to the materials of the first skin, the second skin, the first core material, and the second core material.

In the vehicle interior member of the present invention, the first rim part may be provided only on a part of the peripheral edge part of the first skin, or may be provided on the whole periphery of the peripheral edge part. The second rim part may be provided only on a part of the peripheral edge part of the second skin, or may be provided on the whole periphery of the peripheral edge part.

Here, for example, as disclosed in Japanese Patent No. 4973956, when the first skin material and the second skin material are bound together to face each other inside, and this is turned over and put on the base material, in the process, it is difficult to provide the first rim part on the whole periphery of the peripheral edge part of the first skin material and the second rim part on the whole periphery of the peripheral edge part of the second skin material. For example, in order to provide the first rim part on the whole periphery of the peripheral edge part of the first skin material, and to provide the second rim part on the whole periphery of the peripheral edge part of the second skin material, when the first skin material and the second skin material are stitched together to face each other inside and the whole periphery thereof are stitched together, a skin body which is an integrated product of the first skin material and the second skin material cannot be turned over.

On the other hand, in the vehicle interior member of the present invention, since the first peripheral edge core part is sandwiched by the first rim part, the second peripheral edge core part is sandwiched by the second rim part, and these are stitched together by the stitch part, there is an advantage of easily obtaining the vehicle interior member in which the first rim part is provided on the whole periphery of the peripheral edge part of the first skin and the second rim part is provided on the whole periphery of the peripheral edge part of the second skin. In particular, when the whole vehicle interior member is exposed in the vehicle interior, the vehicle interior member, in which the first rim part is provided on the whole periphery of the peripheral edge part of the first skin and the second rim part is provided on the whole periphery of the peripheral edge part of the second skin, displays an excellent design having continuity.

The first back rim part and the second back rim part may extend to a center portion of the vehicle interior member of the present invention, or may not exist at the center portion thereof. When the vehicle interior member of the present invention is large, it is desirable that the first back rim part and the second back rim part exist only in the peripheral edge portion of the vehicle interior member of the present invention and do not exist in the center portion thereof. Here, in the center portion of the vehicle interior member of the present invention, the respective elements are superposed in the order of a center portion of the first skin, a center portion of the first core material, a center portion of the second core material, and a center portion of the second skin.

Hereinafter, as necessary, the center portion of the first skin is referred to as a first general skin part, the center portion of the first core material is referred to as a first general core part, the center portion of the second core material is referred to as a second general core part, and the center portion of the second skin is referred to as a second general skin part.

The first general skin part, the first general core part, the second general core part, and the second general skin part may be adjacent to each other in this order, or another element may be interposed between any of these elements. For example, a cushion material having elasticity may be interposed between the first general core part and the first general skin part, or between the second general core part and the second general skin part. Here, elasticity derived from the cushion material is provided to the vehicle interior member of the present invention. As the cushion material, an elasticity material such as polyurethane and rubber may be used, and a foaming material such as foaming polyurethane and foaming polyethylene, and foaming rubber may be used.

When the first rear rim part and the second rear rim part do not exist at the center portion of the vehicle interior member of the present invention, a gap is formed between the first general core part and the second general core part by the total thickness of the first back rim part and the second back rim part. In such a case, a spacer for filling the gap may be interposed between the first general core part and the second general core part. A material of the spacer is not particularly limited. The spacer may be soft or hard.

An overall shape of the vehicle interior member of the present invention is not particularly limited, and may be formed as a shape along the base material surface of the vehicle mounting member. For example, when the base material surface is flat, the vehicle interior member of the present invention may also be flat. When the base material surface is a bent surface shape, the vehicle interior member of the present invention may be also formed as a bent shape along the bent surface. Here, the bent shape herein includes a curved shape and a crooked shape. Only a part of the vehicle interior member of the present invention may be formed as the bent shape.

Meanwhile, when the vehicle interior member of the present invention is formed as the bent shape, a radius of curvature of one surface is larger than a radius of curvature of the other surface. For example, in a case where a radius of curvature of the first skin is larger than a radius of curvature of the second skin, when these are not stitched together so that the second general skin part of the second skin is slightly smaller than the first general skin part of the first skin, the second rim part of the second skin further protrudes outward in a radial direction than the first rim part of the first skin.

For example, when the first skin and the second skin are stitched together to face each other inside and turned over, the work of stitching the first skin and second skin together so that the second general skin part becomes slightly smaller than the first general skin part is complicated, and also requires a skill for a worker.

However, when manufacturing the vehicle interior member of the present invention, for example, the first core material and the second core material may be formed in advance into a bent shape along the base material surface, the first skin and the second skin may be superposed along the shaped first core material and the second core material, and the first rim part and the second rim part may be folded back. In such manner, the first skin and the second skin are naturally arranged so that the second general skin part is slightly smaller than the first general skin part. Here, when the first rim part, the first peripheral edge core part, the second rim part, and the second peripheral edge core part are stitched together, the vehicle interior member of the present invention having a bent shape can be obtained. In other words, since the vehicle interior member of the present invention does not require the work of stitching the first skin and the second skin together to face each other inside or turning the stitched first skin and second skin over at the time of the manufacturing, a degree of freedom of a shape is excellent.

Hereinafter, the vehicle interior member of the present invention will be described with reference to specific examples.

First Embodiment

Figure 2:
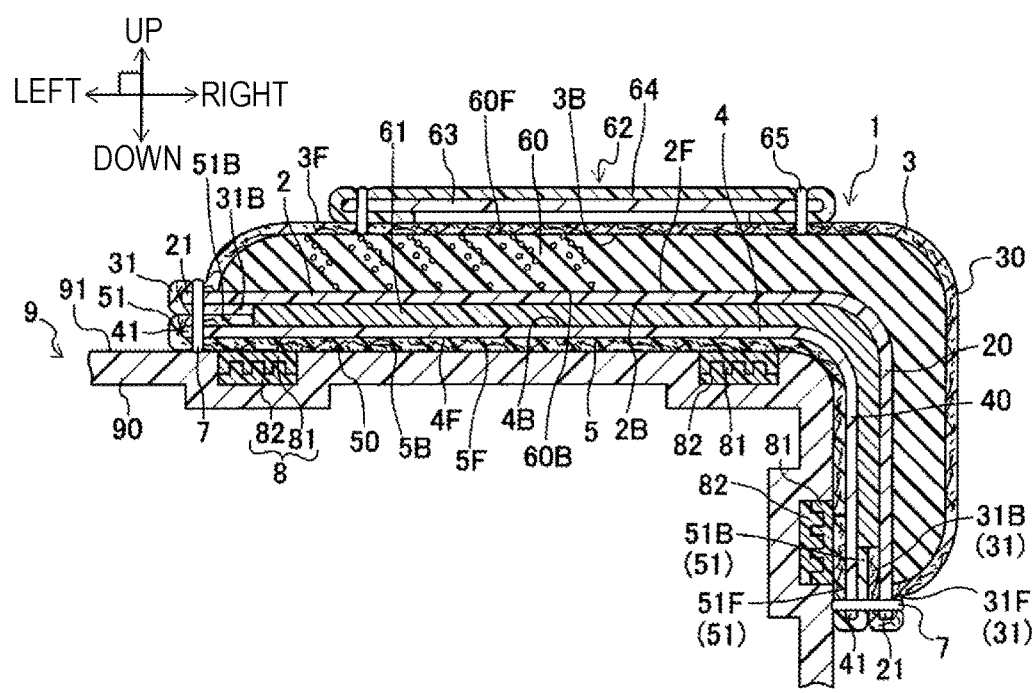
FIG. 2 is an explanatory diagram schematically illustrating a state in which the vehicle interior member according to the first embodiment mounted on a vehicle mounting member is cut at an A-A position in FIG. 1.

FIG. 1 is an explanatory diagram schematically illustrating a vehicle interior member according to a first embodiment. FIG. 2 is an explanatory diagram schematically illustrating a state in which the vehicle interior member according to the first embodiment mounted on a vehicle mounting member is cut at an A-A position in FIG. 1. Hereinafter, up and down are defined as up and down in a vertical direction, and front, rear, left, and right are defined as front, rear, left, and right in a vehicle traveling direction. A left and right direction is a vehicle width direction, and a front and rear direction is a vehicle traveling direction.

As illustrated in FIGS. 1 and 2, a vehicle interior member 1 of the first embodiment includes a first core material 2, a first skin 3, a second core material 4, a second skin 5, a cushion material 60, a spacer 61, a design skin material 62, and a first fastener 81.

A base material 90 of a vehicle mounting member 9 on which the vehicle interior member 1 of the first embodiment is mounted has a bent shape. Therefore, of the base material 90, a base material surface 91 on which the vehicle interior member 1 of the first embodiment is mounted also has the bent surface.

The first core material 2 and the second core material 4 have an almost plate shape that bends along the base material surface 91. The second core material 4 is disposed closer to the side of the base material surface 91 than the first core material 2, and a radius of curvature of the second core material 4 is smaller than a radius of curvature of the first core material 2. Therefore, although the first core material 2 and the second core material 4 have almost the same shape, an outer shape of the second core material 4 is slightly smaller than an outer shape of the first core material 2. The first core material 2 and the second core material 4 are made of polypropylene and have a plate shape with a thickness of 0.5 mm. The Rockwell hardness HRR of the first core material 2 and the second core material 4 is about 110.

The first core material 2 includes a first general core part 20 and a first peripheral edge core part 21. The first general core part 20 is a center portion of the first core material 2, and the first peripheral edge core part 21 is a peripheral edge part of the first core material 2. The first peripheral edge core part 21 is provided over the whole periphery of the first core material 2 in a peripheral direction.

The second core material 4 also includes a second general core part 40 and a second peripheral edge core part 41. The second general core part 40 is a center portion of the second core material 4, and the second peripheral edge core part 41 is a peripheral edge part of the second core material 4. The second peripheral edge core part 41 is provided over the whole periphery of the second core material 4 in the peripheral direction.

The first core material 2 includes a front surface 2F facing upward and a back surface 2B facing downward. The second core material 4 includes a front surface 4F facing downward and a back surface 4B facing upward. Therefore, the back surface 2B and the back surface 4B of the first core material 2 and the second core material 4 are facing each other.

The first skin 3 and the second skin 5 are made of leather. The second skin 5 forms a sheet shape having a slightly larger outer dimension than that of the second core material 4. The first skin 3 forms a sheet shape having a larger diameter than that of the first core material 2.

The first skin 3 is superposed on the upper side of the first core material 2, that is, on the side of the surface 2F. The first skin 3 covers the whole surface 2F of the first core material 2. The first skin 3 has a first general skin part 30 and a first rim part 31. The first general skin part 30 is a center portion of the first skin part 3, and the first rim part 31 is a peripheral edge part of the first skin 3. The first rim part 31 is provided over the whole periphery of the first skin 3 in the peripheral direction.

The first general skin part 30 of the first skin 3 faces the first general core part 20 of the first core material 2. The first rim part 31 includes a first front rim part 31F facing the surface of the first peripheral edge core part 21 and a first back rim part 31B facing the back surface of the first peripheral edge core part 21. Therefore, it can be said that the first rim part 31 has a U-shaped cross section in which the first back rim part 31B is folded back to the side of the back surface 2B of the first core material 2 and sandwiches the first peripheral edge core part 21.

The cushion material 60 is disposed between the first general skin part 30 of the first skin 3 and the first general core part 20 of the first core material 2. The cushion material 60 is made of foaming polyurethane and is elastically deformable. The thickness of the cushion material 60 is thicker than the thickness of the first core material 2 and the first skin 3.

The second skin 5 is superposed on the lower side of the second core material 4, that is, on the side of the surface 4F. The second skin 5 covers the whole surface 4F of the second core material 4. The second skin 5 includes a second general skin part 50 and a second rim part 51. The second general skin part 50 is a center portion of the second skin 5, and the second rim part 51 is a peripheral edge part of the second skin 5. The second rim part 51 is provided over the whole periphery of the second skin 5 in the peripheral direction.

The second general skin part 50 of the second skin 5 faces the second general core part 40 of the second core material 4. The second rim part 51 includes a second front rim part 51F facing the surface of the second peripheral edge core part 41 and a second back rim part 51B facing the back surface of the second peripheral edge core part 41. Therefore, it can be said that the second rim part 51 forms a U-shaped cross section in which the second back rim part 51B is folded back to the side of the back surface 4B of the second core material 4 and sandwiches the second peripheral edge core part 41.

As described above, the first core material 2 and the second core material 4, and the back surface 2B and the back surface 4B face each other. Therefore, the first back rim part 31B of the first skin 3 folded back to the side of the back surface 2B of the first core material 2 and the second back rim part 51B of the second skin 5 folded back to the side of the back surface 4B of the second core material 4 faces each other. A gap is formed between the back surface 2B of the first core material 2 and the back surface 4B of the second core material 4 by the thickness of the first back rim part 31B and the second back rim part 51B. In the vehicle interior member 1 of the first embodiment, the spacer 61 is disposed in the gap. The spacer 61 is made of the same polypropylene as those of the first core material 2 and the second core material 4.

The second skin 5 and the second core material 4 are bonded to each other.

Specifically, the second general skin part 50 and the second general core part 40 are bonded to each other. The second front rim part 51F and the second peripheral edge core part 41 are bonded to each other, and the second back rim part 51B and the second peripheral edge core part 41 are bonded to each other.

The first skin 3, the cushion material 60, and the first core material 2 are also bonded to each other.

Specifically, the cushion material 60 and the first general core part 20 are bonded to each other. The cushion material 60 and the first general skin part 30 are also bonded to each other. The first front rim part 31F is bonded to the first peripheral edge core part 21, and the first back rim part 31B is bonded to the first peripheral edge core part 21.

The first rim part 31, the first peripheral edge core part 21, the second rim part 51, and the second peripheral edge core part 41 are stitched together by a stitch part 7.

In the vehicle interior member 1 of the first embodiment, the design skin material 62 is integrated with a surface 3F of the first skin 3. The design skin material 62 includes a sub-core material 63 made of the same polypropylene as those of the first core material 2 and the second core material 4, and a sub skin 64 covering the surface of the sub-core material 63. A peripheral edge part of the sub skin 64 is folded back to the back surface side of the sub-core material 63 over the whole periphery thereof, thereby sandwiching a peripheral edge part of the sub-core material 63. The sub skin 64 and the sub-core material 63 are bonded to each other. The peripheral edge part of the sub skin 64 and the peripheral edge part of the sub-core material 63 are stitched to the surface 3F of the first skin 3 by a sub-stitch part 65.

A first fastener 81, which is one of the hook-and-loop fasteners 8, is bonded to a surface 5F of the second skin 5. The first fastener 81 engages with a second fastener 82 fixed to the base material 90. By engaging the first fastener 81 with the second fastener 82, the vehicle interior member 1 of the first embodiment is mounted on the base material 90 of the vehicle mounting member 9.

When manufacturing the vehicle interior member 1 of the first embodiment, first, the first core material 2 forms a bent shape corresponding to the base material surface 91 of the base material 90, and a back surface 60B of the cushion material 60 is bonded to the front surface 2F of the first core material 2. The back surface 3B of the first skin 3 to which the design skin material 62 is stitched is bonded to a front surface 60F of the cushion material 60. Then, the first rim part 31 of the first skin 3 is folded back to the side of the back surface 2B of the first core material 2, and the first back rim part 31B is bonded to the first peripheral edge core part 21 on the side of the back surface 2B of the first core material 2 while sandwiching the first peripheral edge core part 21 by the first rim part 31. According to the above-described process, an integrated product of the first core material 2, the cushion material 60, the design skin material 62, and the first skin 3 is obtained.

Apart therefrom, the second core material 4 forms a bent shape corresponding to the base material surface 91 of the base material 90, and the back surface 5B of the second skin 5 is bonded to the front surface 4F of the second core material 4. Next, the second rim part 51 of the second skin 5 is folded back to the side of the back surface 4B of the second core material 4, and the second back rim part 51B is bonded to the second peripheral edge core part 41 on the side of the back surface 4B of the second core material 4 while sandwiching the second peripheral edge core part 41 by the second rim part 51, whereby an integrated product of the second core material 4 and the second skin 5 is obtained.

While the spacer 61 to which an adhesive is applied on both front and back surfaces is sandwiched between the back surface 2B of the first core material 2 and the back surface 4B of the second core material 4, the integrated product of the first core material 2, the cushion material 60, the design skin material 62, and the first skin 3, and the integrated product of the second core material 4, the first fastener 81, and the second skin 5 are superposed so that the back surface 2B of the first core material 2 and the back surface 4B of the second core material 4 face each other. Next, the first rim part 31, the first peripheral edge core part 21, the second rim part 51, and the first peripheral edge core part 21 are stitched together by the stitch part 7. The first fastener 81 is bonded to the surface 5F of the second skin 5, whereby the vehicle interior member 1 of the first embodiment is obtained.

In the vehicle interior member 1 of the first embodiment, the thickness of the first rim part 31 and the thickness of the second rim part 51 are almost the same. Therefore, it can be said that the vehicle interior member 1 of the first embodiment is given excellent design properties by the first rim part 31 and the second rim part 51 having almost the same thickness and a uniform appearance.

In the vehicle interior member 1 of the first embodiment, the first rim part 31 for sandwiching the first peripheral edge core part 21 forms a shape along the first peripheral edge core part 21. The second rim part 51 for sandwiching the second peripheral edge core part 41 forms a shape along the second peripheral edge core part 41. Therefore, in order to make the thickness of the first rim part 31 and the thickness of the second rim part 51 almost the same, it is sufficient to make the thickness of the first skin 3 and the thickness of the second skin 5 almost the same, and to make the thickness of the first peripheral edge core part 21 and the thickness of the second peripheral edge core part 41 almost the same. Therefore, it can be said that the vehicle interior member 1 of the first embodiment can be manufactured with high workability in spite of having excellent design properties.

The vehicle interior member 1 of the first embodiment includes the first rim part 31 and the second rim part 51 over the whole periphery of the peripheral edge part. Therefore, the vehicle interior member 1 of the first embodiment shows the excellent design properties even when the whole vehicle interior member 1 is exposed in the vehicle interior. As described above, this can be attributed to a structure of the vehicle interior member 1 of the present invention.

Second Embodiment

A vehicle interior member of a second embodiment is formed in such a manner that a spacer is integrated with a second core material, an engagement claw is provided in place of a first fastener, and the engagement claw is further integrated with the second core material. Other than this, the vehicle interior member of the second embodiment is almost the same as the vehicle interior member of the first embodiment.

Figure 3:
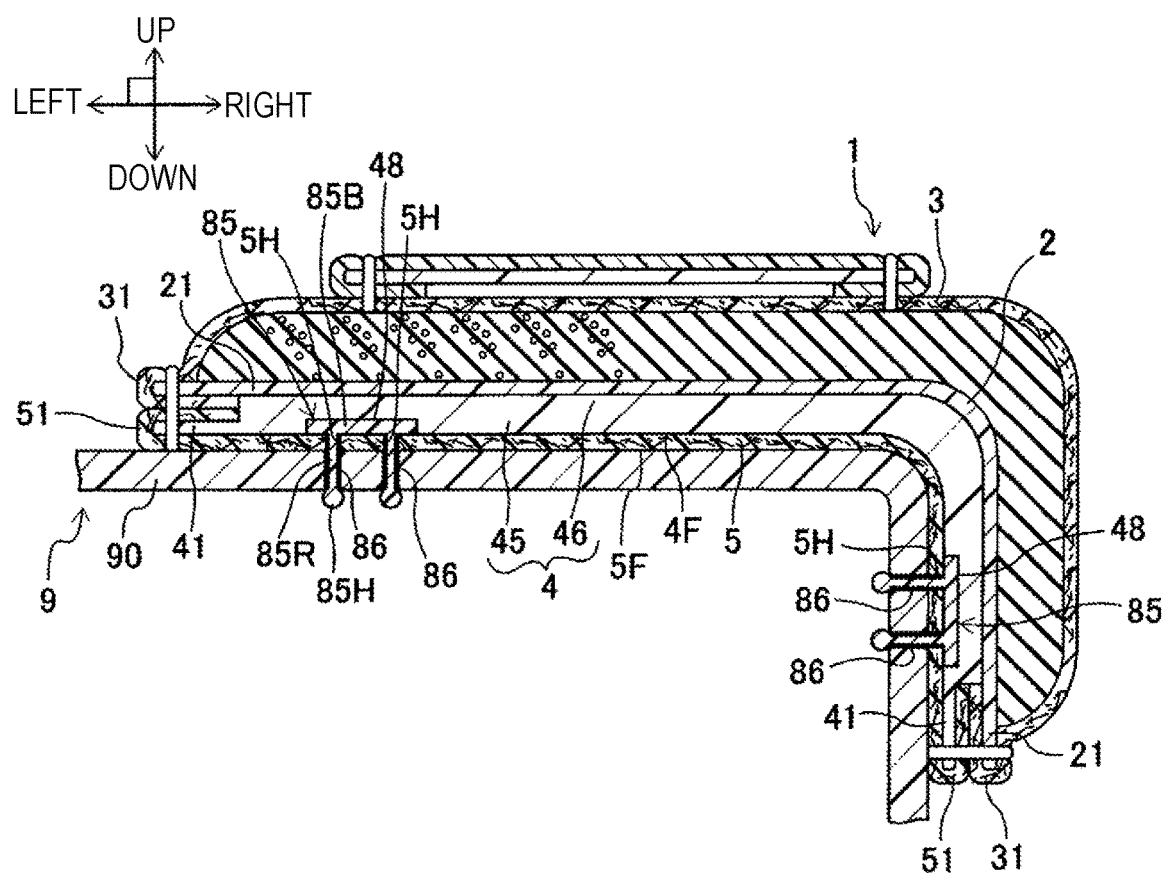
FIG. 3 is an explanatory diagram schematically illustrating a state in which a vehicle interior member according to a second embodiment mounted on the vehicle mounting member is cut at the same position as the A-A position in FIG. 1.

FIG. 3 is an explanatory diagram schematically illustrating a state in which the vehicle interior member of the second embodiment mounted on the vehicle mounting member is cut at the same position as the A-A position in FIG. 1.

As illustrated in FIG. 3, the second core material 4 in the vehicle interior member 1 of the second embodiment includes a core part 45 having almost the same shape as that of the second core material 4 of the vehicle interior member 1 of the first embodiment, and a spacer part 46 integrated with a back side portion (an upper side portion in FIG. 3) of the core part 45. The spacer part 46 has almost the same shape as that of the spacer 61 of the vehicle interior member 1 of the first embodiment. The core part 45 and the spacer part 46 are integrally molded. A recessed-shaped engagement support part 48 is formed on the surface 4F of the second core material 4. An engagement claw 85 is mounted on the engagement support part 48. The engagement claw 85 includes an almost plate-shaped engagement base part 85B, a columnar leg part 85R extending from the engagement base part 85B, and a head part 85H formed at the tip of the leg part 85R. The head part 85H forms an almost spherical shape having a larger diameter than that of the leg part 85R.

The engagement base part 85B is fitted into the engagement support part 48, and is bonded to the second core material 4 at the engagement support part 48. In the second skin 5 covering the surface 4F of the second core material 4, a through hole 5H is formed at a position corresponding to the engagement claw 85, and the leg part 85R and the head part 85H are exposed to the surface 5F of the second skin 5 through the through hole 5H.

In the base material 90 of the vehicle mounting member 9, an engagement hole 86 is provided at a position corresponding to the engagement claw 85. The engagement hole 86 is a through hole, the leg part 85R of the engagement claw 85 is inserted into the engagement hole 86, and the head part 85H engages with a peripheral edge part of the engagement hole 86. By the engagement between the engagement claws 85 and the engagement holes 86, the vehicle interior member 1 of the second embodiment is mounted on the base material 90 of the vehicle mounting member 9.

The second core material 4 in the vehicle interior member 1 of the second embodiment is thicker than the first core material 2 by an integral amount of the spacer part 46. The recessed-shaped engagement support part 48 is provided in the second core material 4. Therefore, the shape of the second core material 4 in the vehicle interior member 1 of the second embodiment is significantly different from the shape of the first core material 2.

However, the thickness of the second peripheral edge core part 41 of the second core material 4 and the thickness of the first peripheral edge core part 21 of the first core material 2 are almost the same even in the vehicle interior member 1 of the second embodiment. Therefore, the first rim part 31 and the second rim part 51 have almost the same thickness and a uniform appearance even in the vehicle interior member 1 of the second embodiment. Accordingly, the vehicle interior member 1 of the second embodiment is also excellent in design properties.

The present invention is not limited to the embodiments described above and illustrated in the drawings, and can be implemented with appropriate modifications within a range not departing from the gist of the present invention. Each component shown in the present specification including the embodiments can be respectively arbitrarily extracted and combined for implementation.

What is claimed is:

1. A vehicle interior member, mounted on a base material surface of a vehicle mounting member, the vehicle interior member comprising:
   a first core material;
   a first skin that is softer than the first core material, superposed on a surface of the first core material, and that forms a first rim part having a U-shaped cross section in which at least a portion of a peripheral edge part is folded back to a back surface side of the first core material to sandwich a peripheral edge part of the first core material;
   a second core material superposed on the first core material with respect to the back surface of the first core material;
   a second skin that is softer than the second core material, superposed on a surface of the second core material, and that forms a second rim part having a U-shaped cross section in which at least a portion of a peripheral edge part is folded back to a back surface side of the second core material to sandwich a peripheral edge part of the second core material;
   a first fastener that is bonded to a surface of the second skin;
   a second fastener that is fixed to the base material surface of the vehicle mounting member and configured to engage with the first fastener;
   a spacer that is interposed within a gap formed between the back surface side of the first core material and the back surface side of the second core material, the spacer having an adhesive front surface and an adhesive back surface, the spacer being separated from the base material surface; and
   a stitch part that stitches the first rim part, the peripheral edge part of the first core material sandwiched by the first rim part, the second rim part, and the peripheral edge part of the second core material sandwiched by the second rim part.

2. The vehicle interior member according to claim 1, wherein:
   the first rim part is bonded to the back surface at the peripheral edge part of the first core material; and
   the second rim part is bonded to the back surface at the peripheral edge part of the second core material.

3. The vehicle interior member according to claim 1, wherein:
   a cushion material is disposed between the surface of the first core material and the first skin on a side closer to the center than the first rim part; and
   a thickness of the cushion material is thicker than a thickness of the first core material.

4. The vehicle interior member according to claim 1, wherein:
   the first rim part sandwiches an entire periphery of the peripheral edge part of the first core material; and
   the second rim part sandwiches an entire periphery of the peripheral edge part of the second core material.

5. The vehicle interior member according to claim 1, wherein:
   the base material surface is a bent surface; and
   the first core material and the second core material form a bent shape along the base material surface.

6. The vehicle interior member according to claim 1, wherein:

the first fastener and the second fastener are hook-and-loop fasteners.

7. A method of manufacturing a vehicle interior member, mounted on a base material surface of a vehicle mounting member, the vehicle interior member including:
a first core material;
a first skin that is softer than the first core material, superposed on a surface of the first core material, and that forms a first rim part having a U-shaped cross section in which at least a portion of a peripheral edge part is folded back to a back surface side of the first core material to sandwich a peripheral edge part of the first core material;
a second core material superposed on the first core material with respect to the back surface of the first core material;
a second skin that is softer than the second core material, superposed on a surface of the second core material, and that forms a second rim part having a U-shaped cross section in which at least a portion of a peripheral edge part is folded back to a back surface side of the second core material to sandwich a peripheral edge part of the second core material;
a first fastener that is bonded to a surface of the second skin;
a second fastener that is fixed to the base material surface of the vehicle mounting member and configured to engage with the first fastener;
a spacer that is interposed within a gap formed between the back surface side of the first core material and the back surface side of the second core material, the spacer having an adhesive front surface and an adhesive back surface, the spacer being separated from the base material surface; and
a stitch part that stitches the first rim part, the peripheral edge part of the first core material, sandwiched by the first rim part, the second rim part, and the peripheral edge part of the second core material sandwiched by the second rim part, the base material surface being a bent surface, the first core material and the second core material forming a bent shape along the base material surface, the method comprising:
bonding the first skin to the first core material having the bent shape; and
bonding the second skin to the second core material having the bent shape.

* * * * *